(12) United States Patent
Tsujimoto

(10) Patent No.: US 7,753,593 B2
(45) Date of Patent: Jul. 13, 2010

(54) TAPERED ROLLER BEARING

(75) Inventor: Takashi Tsujimoto, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 964 days.

(21) Appl. No.: 11/143,960

(22) Filed: Jun. 3, 2005

(65) Prior Publication Data

US 2006/0002647 A1 Jan. 5, 2006

(30) Foreign Application Priority Data

Jul. 5, 2004 (JP) ............................ 2004-198700
Jul. 5, 2004 (JP) ............................ 2004-198701

(51) Int. Cl.
*F16C 32/00* (2006.01)
*F16C 41/00* (2006.01)
*F16C 33/58* (2006.01)
*F16C 33/48* (2006.01)

(52) U.S. Cl. ...................... 384/448; 384/571; 384/572

(58) Field of Classification Search ................ 384/448, 384/571, 572, 576, 580, 581, 526
See application file for complete search history.

(56) References Cited

U.S. PATENT DOCUMENTS

| | | | | |
|---|---|---|---|---|
| 1,651,807 A * | 12/1927 | Chapman | .................... | 384/574 |
| 3,400,991 A * | 9/1968 | Haller | ......................... | 384/578 |
| 4,472,006 A * | 9/1984 | Goransson et al. | .......... | 384/576 |
| 4,707,152 A * | 11/1987 | Neese | ......................... | 384/572 |
| 5,074,679 A * | 12/1991 | McLarty | ..................... | 384/526 |
| 5,417,502 A * | 5/1995 | Waldert et al. | .............. | 384/572 |
| 6,742,934 B2 * | 6/2004 | Matsuyama et al. | ......... | 384/572 |

FOREIGN PATENT DOCUMENTS

| | | | |
|---|---|---|---|
| JP | 64-079419 A | | 3/1989 |
| JP | 9-96352 A | | 4/1997 |
| JP | 11-201765 | * | 8/1999 |
| JP | 2000-240661 A | | 9/2000 |
| JP | 2003-28165 | | 1/2003 |
| JP | 2003-166543 A | | 6/2003 |

\* cited by examiner

*Primary Examiner*—Thomas R Hannon
*Assistant Examiner*—Justin Krause
(74) *Attorney, Agent, or Firm*—Arent Fox LLP

(57) ABSTRACT

A tapered roller bearing (1) comprises an inner ring (2), an outer ring (3), a plurality of tapered rollers (4) rollably disposed between the inner and outer rings (2, 3) and a cage (5) for holding the tapered rollers (4) at predetermined circumferential intervals, wherein (the circumferential length on the PCD)−(roller diameter×the number of rollers)<roller diameter. Further, the tapered rollers (4) are uniformly disposed such that the distance between rollers on the PCD is less than (the roller diameter/the number of rollers).

9 Claims, 7 Drawing Sheets

TAPERED ROLLER BEARING

BACKGROUND OF THE INVENTION

1. Field of the Invention

This invention relates to a tapered roller bearing, particularly to a tapered roller bearing suitable for incorporation into the gear device of the transmission of an automobile.

2. Brief Description of the Prior Art

Transmissions (main speed changing units) for automobiles are classified broadly into the manual type and the automatic type. Further, they can also be classified according to the driving system of the vehicle: a trans-axle for front wheel drive (FWD), a transmission for rear wheel drive (RWD), and a transfer (auxiliary speed changing unit) for four-wheel drive (4WD). They are used to speed-change the drive power from the engine and to transmit it to the drive shaft or the like.

FIG. 1 shows an example of the arrangement of the transmission of an automobile. This transmission is of the synchronous type, in which the left side is the engine side and the right side is the drive wheel side in the same figure. A tapered roller bearing 43 is interposed between a main shaft 41 and a main drive gear 42. In this example, the inner periphery of the main drive gear 42 is directly formed with an outer ring raceway surface for the tapered roller bearing 43. The main drive gear 42 is supported by a tapered roller bearing 44 for rotation relative to a casing 45. A clutch gear 46 is connected by engagement to the main drive gear 42, and a synchro-mechanism 47 is disposed adjacent the clutch gear 46.

The synchro-mechanism 47 comprises a sleeve 48 adapted to be moved axially (in a left-right direction in the same figure) by the action of a selector (not shown), a synchronizer key 49 axially slidably installed in the inner periphery of the sleeve 48, a hub 50 connected by engagement to the outer periphery of the main shaft 41, a synchronizer ring 51 slidably mounted on the outer periphery (the cone section) of the clutch gear 46, and a hold-down pin 52 and a spring 53 which elastically press the synchronizer key 49 against the inner periphery of the sleeve 48.

In the state shown in the same figure, the sleeve 48 and synchronizer key 49 are held in the neutral position by the hold-down pin 52. At this time, the main drive gear 42 runs idle relative to the main shaft 1. On the other hand, when the selector is actuated to cause the sleeve to move axially, for example, to the left, from the state shown in the same figure, the synchronizer key 49 moves axially to the left following the sleeve 48, so as to press the synchronizer ring 51 against the inclined surface of the cone section of the clutch gear 46. This decreases the rotative speed of the clutch gear 46 and reversely, increases the rotative speed of the synchro-mechanism 47. And, at about the time when the rotative speeds of the two have synchronized, the sleeve 48 further moves axially to the left, meshing with the clutch gear 46, and the main shaft 41 and the main drive gear 42 are connected to each other through the synchro-mechanism 47. This allows the main shaft 41 and the main drive gear 42 to synchronously rotate.

In this connection, automobile transmissions have recently tended to use low-viscosity oil so as to attain AT, CVT, low fuel consumption, etc., for the transmission. In an environment where low viscosity oil is used, surface-start flaking, which results in a very short life, sometimes occurs in the inner ring raceway surface, where the surface pressure is high, due to poor lubrication when such adverse conditions as (1) high oil temperature, (2) little oil quantity, and (3) loss of pre-load, simultaneously happen.

As for measures against this short life due to surface-start flaking, a direct and effective solution is to reduce the maximum surface pressure. To reduce the maximum surface pressure, it is necessary to change the bearing size or to increase the number of rollers of the bearing if the bearing size is not to be changed. To increase the number of rollers without decreasing the roller diameter, it is necessary to narrow the distance between pockets in the cage. To this end, however, the pitch circle of the cage has to be increased to draw the cage as close as possible to the outer ring.

As an example in which the cage is drawn to the side until it touches the inner diameter surface of the outer ring, there is a tapered roller bearing shown in FIG. 2 (refer to Japanese Patent Laid-Open No. 2003-28165). In this tapered roller bearing 61, the outer peripheral surfaces of the small and large diameter annular sections 62a and 62b of the cage 62 are placed in slide contact with the inner diameter surface of the outer ring 63 so as to guide the cage 62, and the outer diameter surface of the pole section 62c of the cage 62 is formed with a recess 64 for suppressing drag torque, thereby maintaining the non-contact state between the outer diameter surface of the pole section 62c and the raceway surface 63a of the outer ring 63. The cage 62 has the small diameter annular section 62a, the large diameter annular section 62b, and a plurality of pole sections 62c which axially connect the small diameter annular section 62a and the large diameter annular section 62b and which is formed with a recess 64 in the outer peripheral surface thereof. And disposed between successive pole sections 62c are a plurality of pockets for rollably receiving tapered rollers 65. The small diameter annular section 62a is provided with a flange section 62d integrally extending to the inner diameter side. The tapered roller bearing of FIG. 2 is an example intended to improve the strength of the cage 62, wherein the cage 62 is drawn to the side until it touches the inner diameter surface of the outer ring 63 in order to increase the peripheral width of the pole section 62c of the cage 62.

SUMMARY OF THE INVENTION

In the tapered roller bearing 61 described in Japanese Patent Application Laid-Open under No. 2003-28165, the cage 62 is drawn to the side until it touches the inner diameter surface of the outer ring 63 to thereby increase the peripheral width of the pole section 62c of the cage 62. Further, because of the presence of the recess 64 in the pole section 62c of the cage 62, the plate thickness becomes inevitably thin, leading to a decrease in the rigidity of the cage 62, involving the possibility of the cage 62 being deformed depending on the stresses during assembly of the bearing 61 or the cage 62 being deformed during rotation of the bearing 61.

On the other hand, a conventional typical tapered roller bearing with a cage, excluding the tapered roller bearing described in Japanese Patent Laid-Open No. 2003-28165, is designed so that the roller coefficient γ (roller packaging percentage) defined by the following formula is normally not more than 0.94 in order to obtain appropriate pole strength and smooth rotation of the cage 72 by securing the pole width of the cage 72 after avoidance, as shown in FIG. 3, of contact between the outer ring 71 and the cage 72.

Roller coefficient $\gamma=(Z \cdot DA)/(\pi \cdot PCD)$, where Z is the number of rollers, DA is the mean diameter of the rollers, and PCD is the pitch circle diameter.

In addition, in FIG. 3, the numeral 73 denotes the tapered roller; 74 denotes a pole surface; 75 denotes the inner ring; and θ denotes a window angle.

An object of the invention is to prevent premature breakage due to an increase in loading capacity and excessive surface pressure.

According to an embodiment of the invention, a tapered roller bearing is characterized in that it comprises an inner ring, an outer ring, a plurality of tapered rollers rollably disposed between the inner and outer rings, and a cage for holding the tapered rollers at predetermined circumferential intervals, wherein (the circumferential length on the PCD)−(roller diameter×the number of rollers)<roller diameter. In other words, the difference between peripheral length on the roller pitch circle and the product of the roller diameter and the number of rollers is smaller than the roller diameter.

According to another embodiment of the invention, a tapered roller bearing comprises an inner ring, an outer ring, a plurality of tapered rollers rollably disposed between the inner and outer rings, and a cage for holding the tapered rollers at predetermined circumferential intervals, wherein the tapered rollers are uniformly disposed such that the distance between rollers on the PCD is less than (the roller diameter/the number of rollers).

The window angle of the pockets of the cage may range from than 55° to 80°. The term "window angle" refers to the angle formed by the guide surfaces of pole sections abutting against the peripheral surface of a single roller. The reason for setting the window angle at not less than 55° is for the purpose of securing good state of contact with the roller, and the reason for setting it at not more than 80° is that if this value is exceeded, the radial pressing force increases, involving the danger that smooth rotation cannot be obtained even if self-lubricating resin material is used. In addition, usual cages have a window-angle of 25°-50°.

The cage may be constituted by engineering plastic superior in mechanical strength, oil resistance, and heat resistance. The use of resin material for the cage has a feature that, as compared with a cage made of iron plate, the cage is light-weight, is self-lubricating, and has a low friction coefficient, which feature, coupled with the effect of the lubricating oil present in the bearing, makes it possible to suppress occurrence of wear due to contact with the outer ring.

As compared with steel plate, such resin is light-weight and has so low a friction coefficient that it is suitable for reducing torque loss and cage wear at the time of starting of the bearing.

Engineering plastics include general purpose engineering plastics and super engineering plastics. Typical ones are shown below but these are by way of example, and the invention is not limited thereto.

General purpose engineering plastics: polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), ultra high molecular weight polyethylene (UHMW-PE)

Super engineering plastics: polysulfone (PSF), polyether sulfone (PES), polyphenylene sulfide (PPS), polyarylate (PAR), polyamideimide (PAI), polyetherimide (PEI), Poly-ether-Etherketone (PEEK), liquid crystal polymer (LCP), thermoplastic polyimide (TPI), polybenz-imidazole (PBI), polymethyl pentene (TPX), poly 1, 4-cyclohexane dimethyl-ene terephthalate (PCT), polyamide 46 (PA46), polyamide 6T (PS6T), polyamide 9T (PA9T), polyamide 11, 12) (PA11, 12), fluororesin, polyphthalamide (PPA).

According to this invention, not only the loading capacity increases but also the maximum surface pressure on the raceway surface can be reduced, so that the surface-start flaking, which results in very short life, under conditions of harsh lubrication can be prevented.

These and other objects and features of the invention will become more apparent as the description proceeds with reference to the drawings.

DESCRIPTION OF THE PREFERRED EMBODIMENTS

Figure 4:
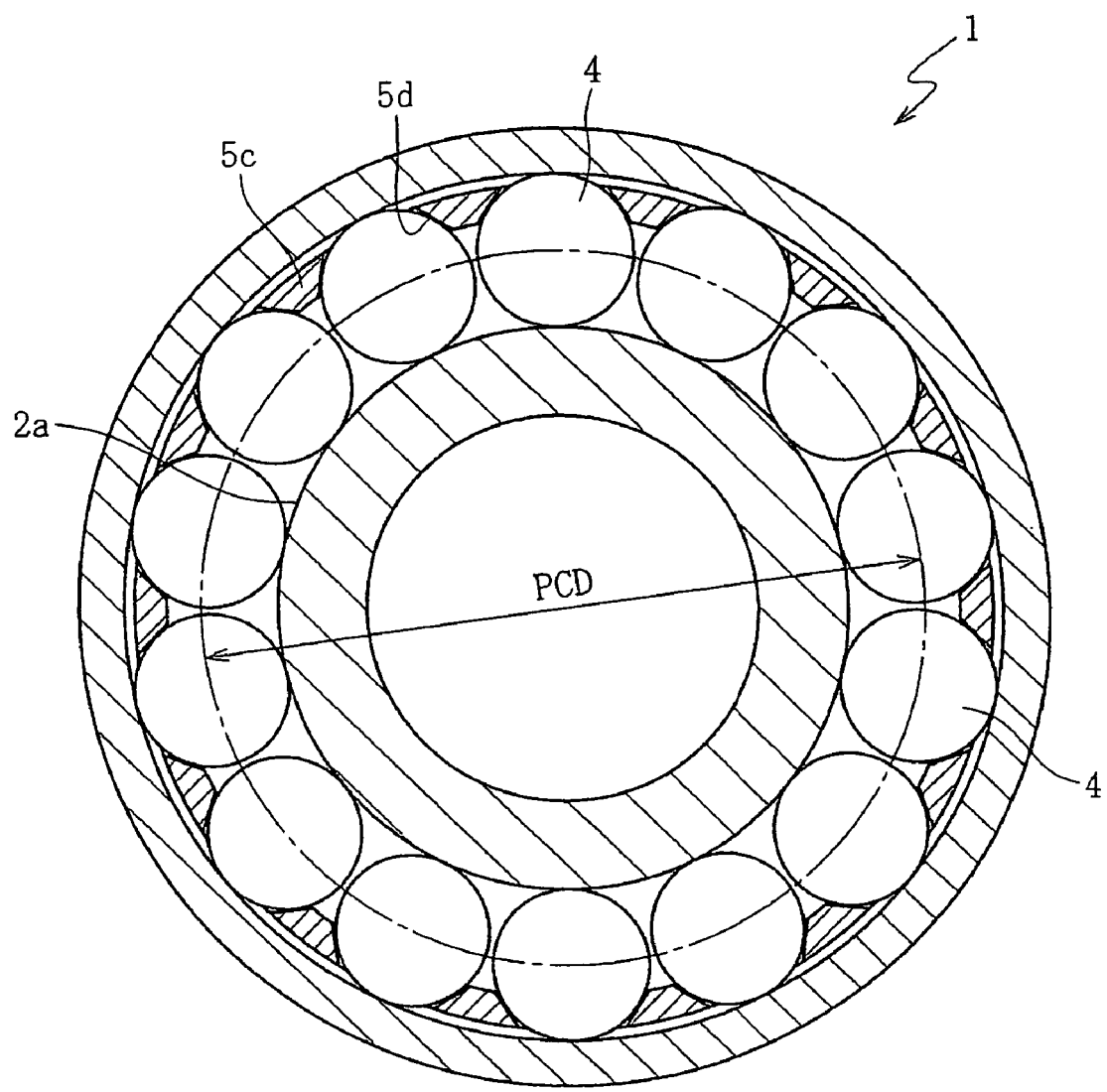
FIG. 4 is a across-sectional view of a tapered roller bearing according to an embodiment of the invention.
Figure 5:
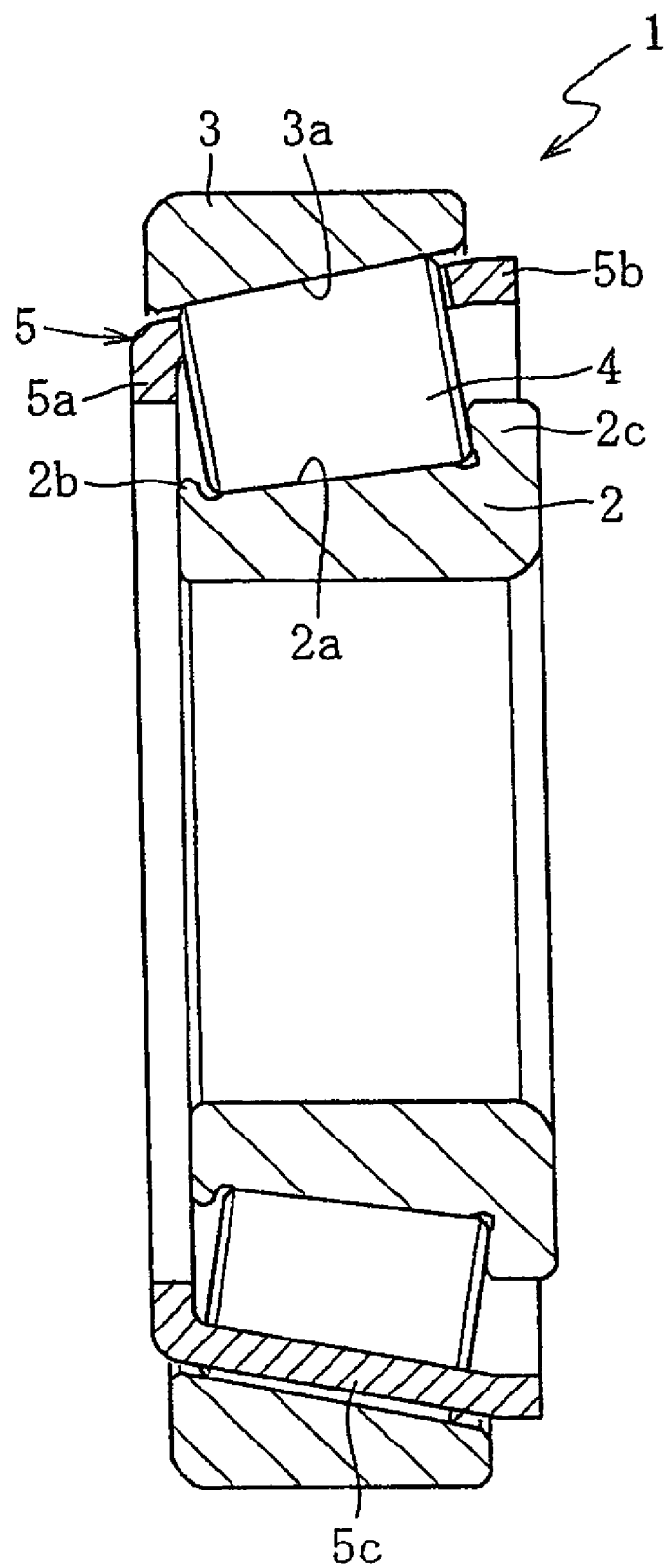
FIG. 5 is a longitudinal sectional view of the bearing.

A tapered roller bearing 1 in an embodiment shown in FIGS. 4 and 5 has a tapered raceway surface 2a and comprises an inner ring 2 having a small flange section 2b on the diameter side of the raceway surface 2a and a large flange section 2c on the large diameter side, an outer ring 3 having a tapered raceway surface 3a, a plurality of tapered rollers 4 rollably disposed between the raceway surface 2a of the inner ring 2 and the raceway surface 3a of the outer ring 3, and a cage 5 for holding the tapered rollers 4 at circumferentially equispaced intervals. Here, the tapered roller bearing 1 satisfies the relation (circumferential length on PCD)−(roller diameter×the number of rollers)<roller diameter. Further, the distance between rollers on the roller PCD is less than (roller diameter/the number of rollers).

The cage 5, which is integrally molded of a super engineering plastic, such as, for example, PPS, PEEK, PA, PPA, or PAI, comprises an annular section 5a on the small diameter side, an annular section 5b on the large diameter side, and a plurality of pole sections 5c axially connecting the annular sections 5a and 5b on the small and large diameter sides.

Figure 1:
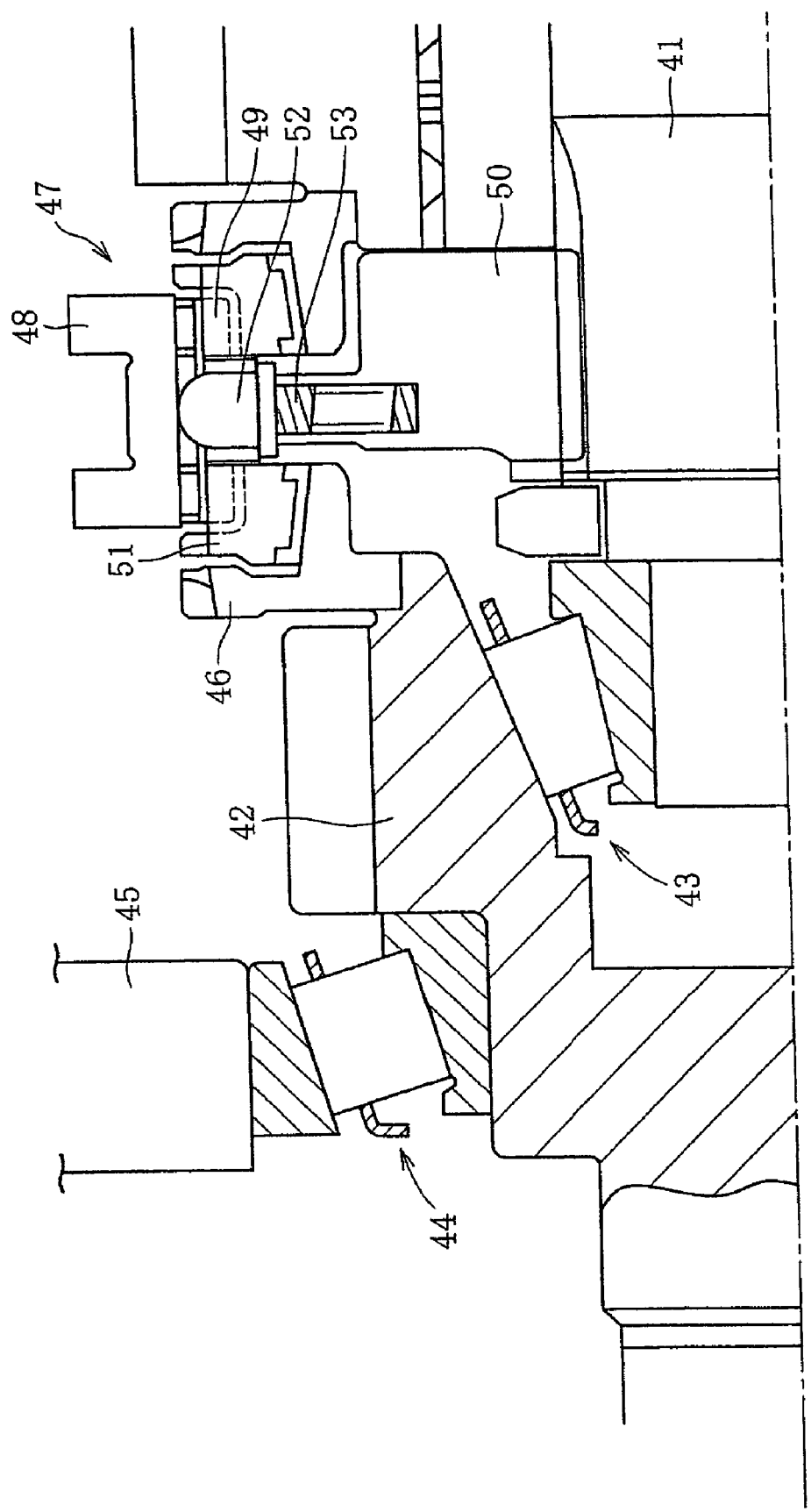
FIG. 1 is a sectional view of a general transmission for automobiles.
Figure 2:
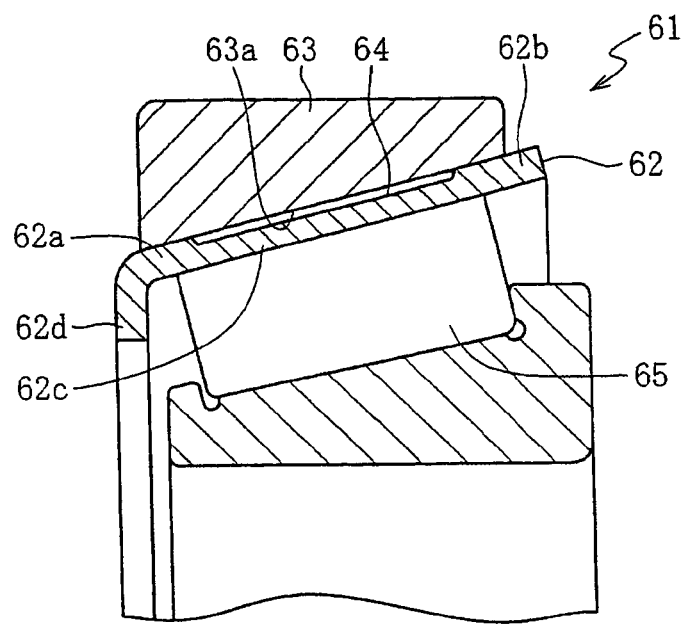
FIG. 2 is a sectional view of a conventional tapered roller bearing with the cage drawn to the outer ring.
Figure 3:
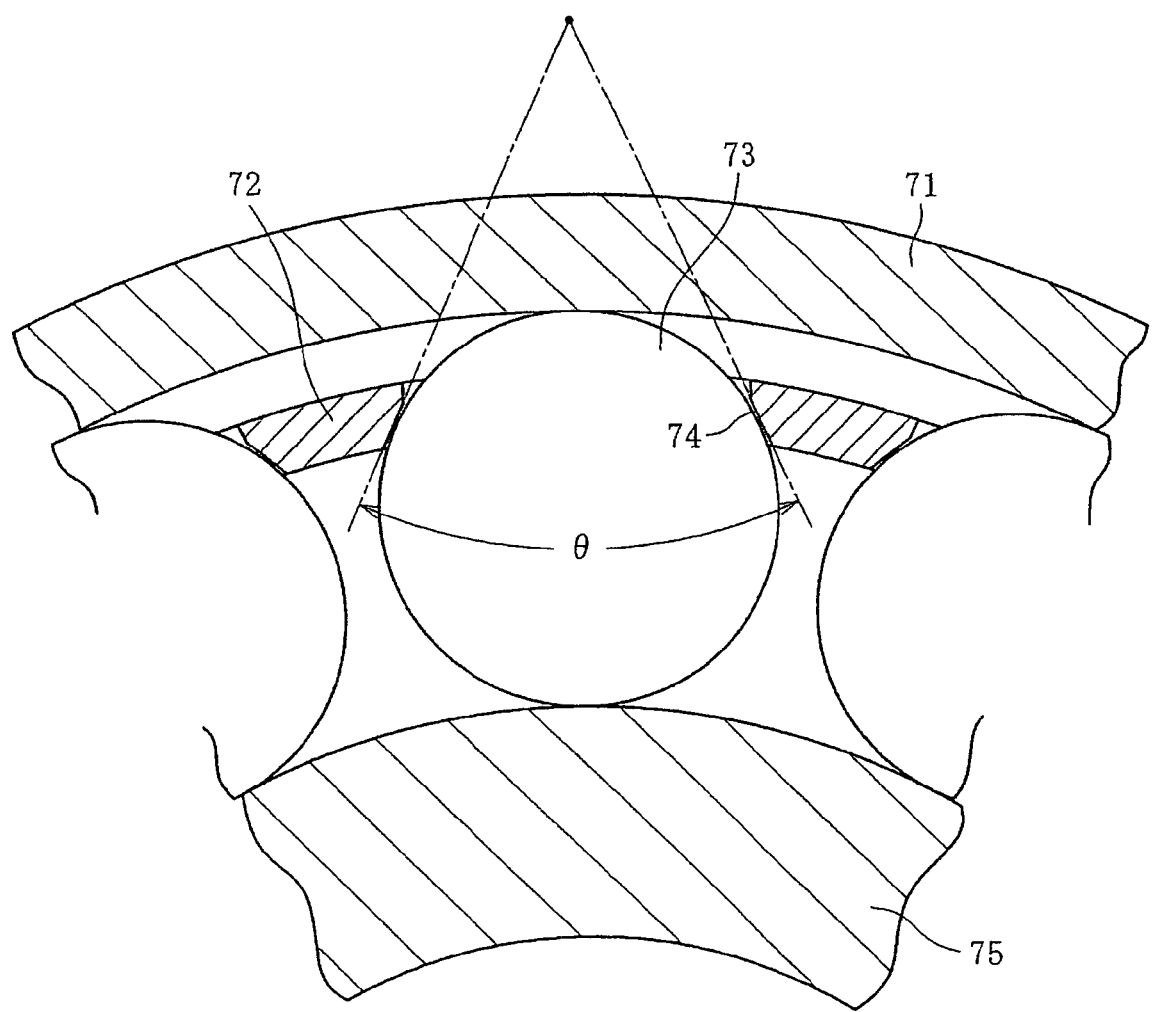
FIG. 3 is a partial enlarged sectional view of another conventional tapered roller bearing.
Figure 6:
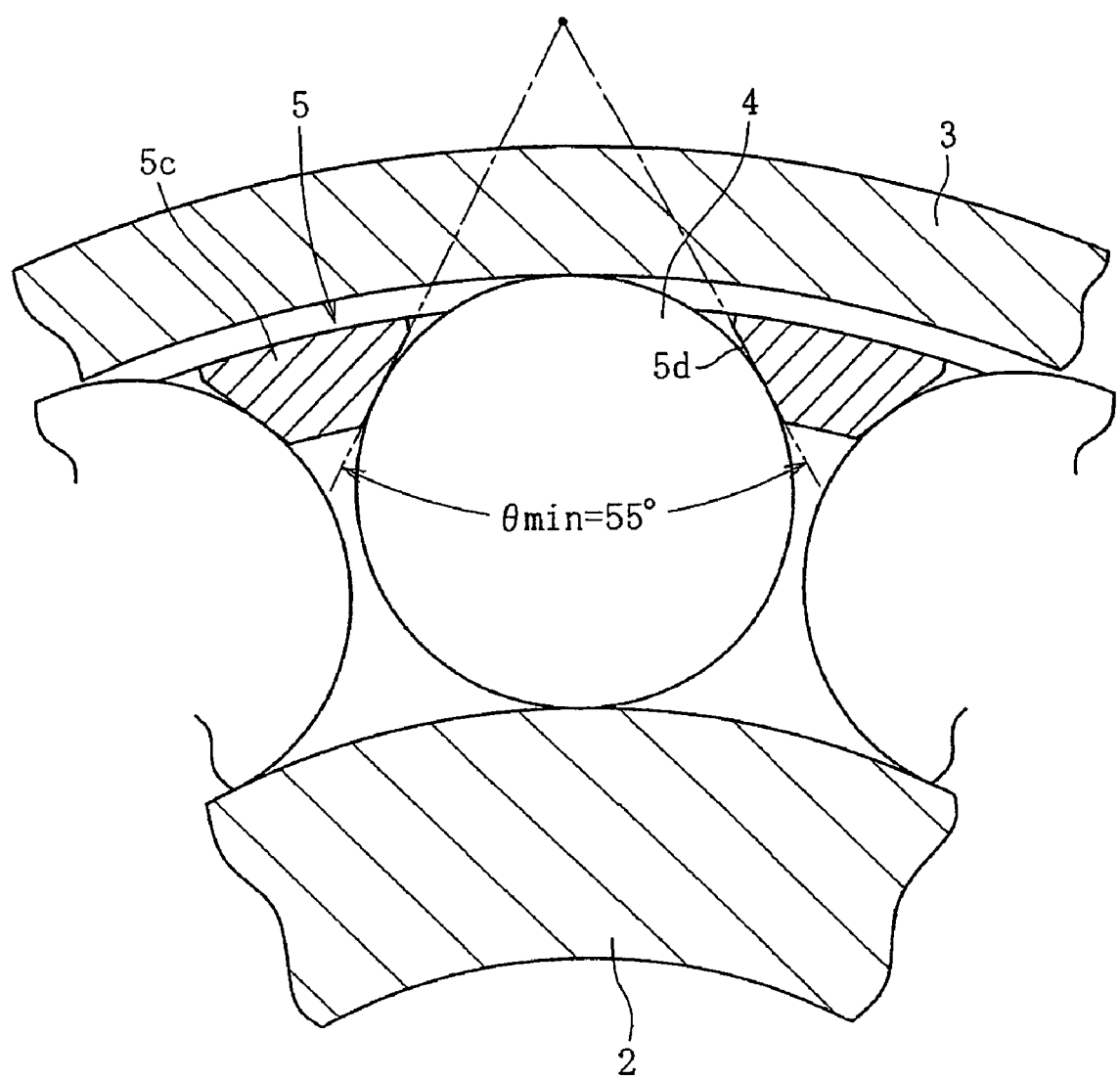
FIG. 6 is a partial enlarged sectional view of a tapered roller bearing with a window angle at its lower limit.
Figure 7:
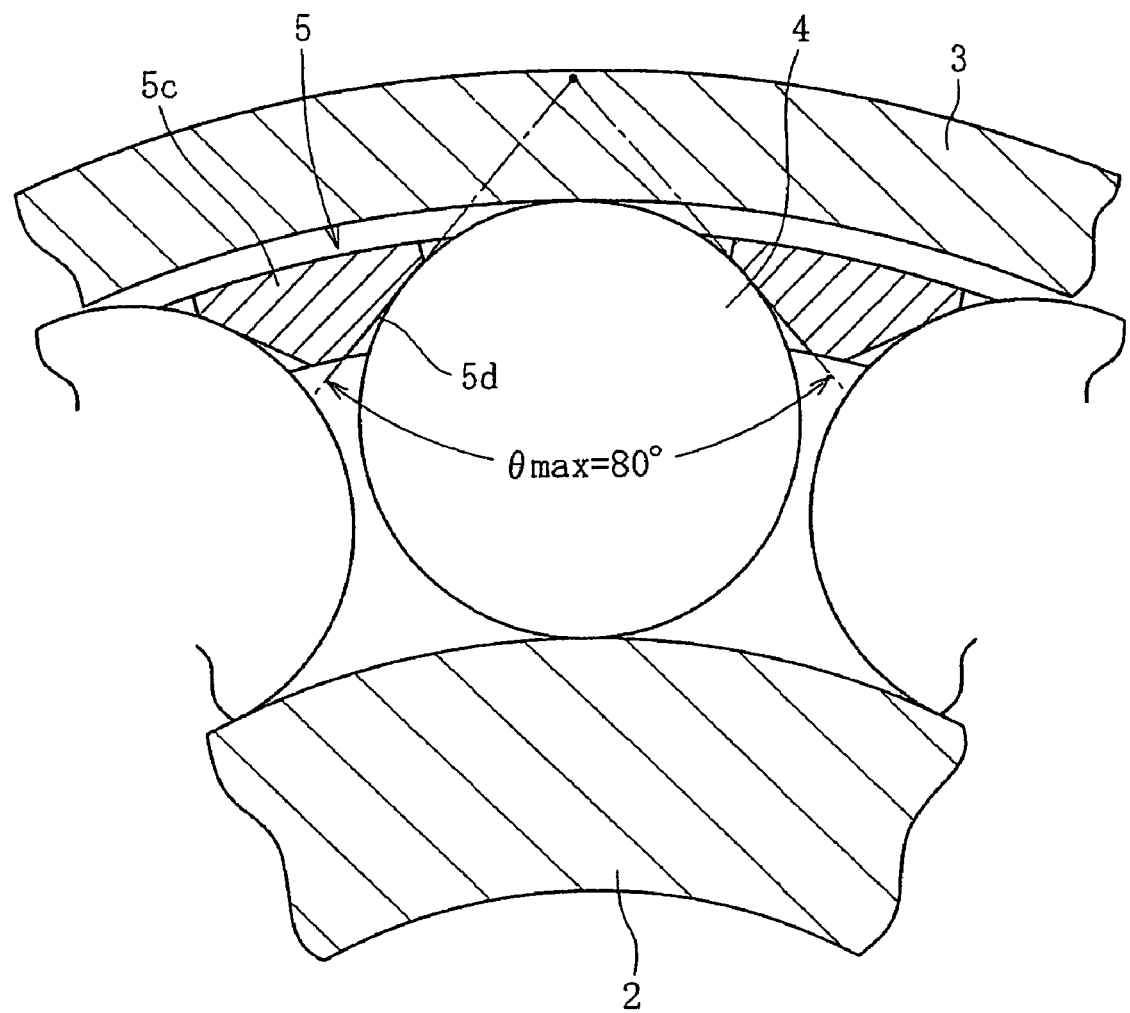
FIG. 7 is a partial enlarged sectional view of a tapered roller bearing with a window angle at its upper limit.

The window angle θ of pole surfaces 5d is such that the lower limit window angle θ min is 55°, as shown in FIG. 6, and the upper limit window angle θ max is 80°, as shown in FIG. 7. The window angle, as shown in FIG. 3, for a typical tapered roller bearing with a cage which is spaced from the outer ring is about 50° at most. Here, the window angle is set at a somewhat large value, so that the difference between the length of the roller pitch circle diameter, and the product of the roller diameter and the number of rollers is smaller than the roller diameter {(circumferential length on PCD)−(roller diameter×the number of rollers)<roller diameter}. Further, the intervals on PCD is less than (roller diameter/the number of rollers). The reason for setting the lower limit window angle θ min at 55° is for the purpose of securing good state of contact with the roller; if the window angle is less than 55°, the state of contact with the roller becomes poor. That is, if the window angle is 55° or above, after securing the cage strength it is possible to secure the relation (circumferential length on PCD)−(roller diameter×the number of rollers)<roller diameter or to make the distance between rollers on the roller PCD less than (roller diameter×the number of rollers) and to secure a good state of contact. Further, the reason for setting the upper limit window angle θ max at 80° is that if it exceeds this value, the radial pressing force increases, involving the danger that smooth rotation cannot be obtained even if self-lubricating resin material is used.

Table 1 shows the results of life tests. In Table 1, "Comparative example" in "Bearing" column is a typical conventional tapered roller bearing with a cage which is spaced from the outer ring. "Embodiment 1" refers to those of the tapered roller bearings of the invention in which there holds the relation (the circumferential length on the PCD)−(roller diameter×the number of rollers)<roller diameter. "Embodiment 2" refers to tapered roller bearings of the invention in which there holds the relation (the circumferential length on the PCD)−(roller diameter×the number of rollers)<roller diameter and in which the window angle is 55°-80°. Further, in "Embodiment 1" and "Embodiment 2," the distance between rollers on the PCD is less than (roller diameter/the number of rollers).

The tests were conducted under conditions of harsh lubrication and excessive load. As is clear from Table 1, "Embodiment 1" has a long life which is not less than twice the life of "Comparative example." Further, the bearing of "Embodiment 2" has a roller coefficient of 0.96, which is the same as in "Embodiment 1," but its life time is not less than about five times that of "Embodiment 1." In addition, the size of "Comparative example," "Embodiment 1, and "Embodiment 2" is φ45×φ81×16 (in mm). The number of rollers is 24 for "Comparative example 1," and 27 for "Embodiment 1" and "Embodiment 2." Oil film parameter Λ=0.2.

TABLE 1

Life Test Results

| Bearing | Circumferential length on PCD - roller diameter × the number of rollers (in mm) | Distance between rollers on PCD (in mm) | Roller diameter/the number of rollers |
|---|---|---|---|
| Comparative example (cage of iron plate) | 29.08 | 1.21 | 0.31 |
| Example 1 (cage of iron plate) | 6.85 | 0.25 | 0.27 |
| Example 2 | 6.85 | 0.25 | 0.27 |

| Life time (in hours) | Remarks |
|---|---|
| 16.4 | Inner ring flaking |
| 40.2 | Stopped by torque increase due to cage wear |
| Not less than 200 | Nothing abnormal, so test stopped |

A modified embodiment of the invention will now be described with reference to FIGS. 8 and 9. The tapered roller bearing 1 shown in the same figures is in the form in which the outer diameter surface of each of the bridge sections 5c of a cage integrally molded of engineering plastic is formed with a projecting section 5f convexed toward the outer ring raceway surface. The rest of the arrangement is the same as in the cage 5 described above. This projecting section 5f, as shown in FIG. 9, is such that the cross sectional contour of the bridge section 5c is arcuate. The radius of curvature $R_2$ of this arc is smaller than the outer ring raceway surface radius $R_1$. The intension is to ensure that a good wedge-like oil film is formed between the projecting section 5f and the outer ring raceway surface. It is desirable that the radius of curvature $R_2$ of the projecting section be about 70-90% of the outer ring raceway surface radius $R_1$. If it is less than 70%, the inlet angle of the wedge-like oil film becomes so large that the dynamic pressure decreases. Further, if it exceeds 90%, the inlet opening angle of the wedge-like oil film becomes so small that the dynamic pressure likewise decreases. Further, the width $W_2$ of the projecting section 5f is desirably more than 50% of the width $W_1$ of the bridge section 5c ($W_2 \geq 0.5 \times W$). The reason is that if it is less than 50%, the height of the projecting section 5f cannot be secured sufficiently to form a good wedge-like oil film. In addition, the outer ring raceway surface radius $R_1$ continuously changes from large diameter side to small diameter side, so that similarly the radius of curvature $R_2$ of the projecting section 5f continuously changes from the large radius of curvature $R_2$ of the large diameter-side annular section 5b to the small radius of curvature $R_2$ of the small diameter-side annular section 5a.

Figure 8:
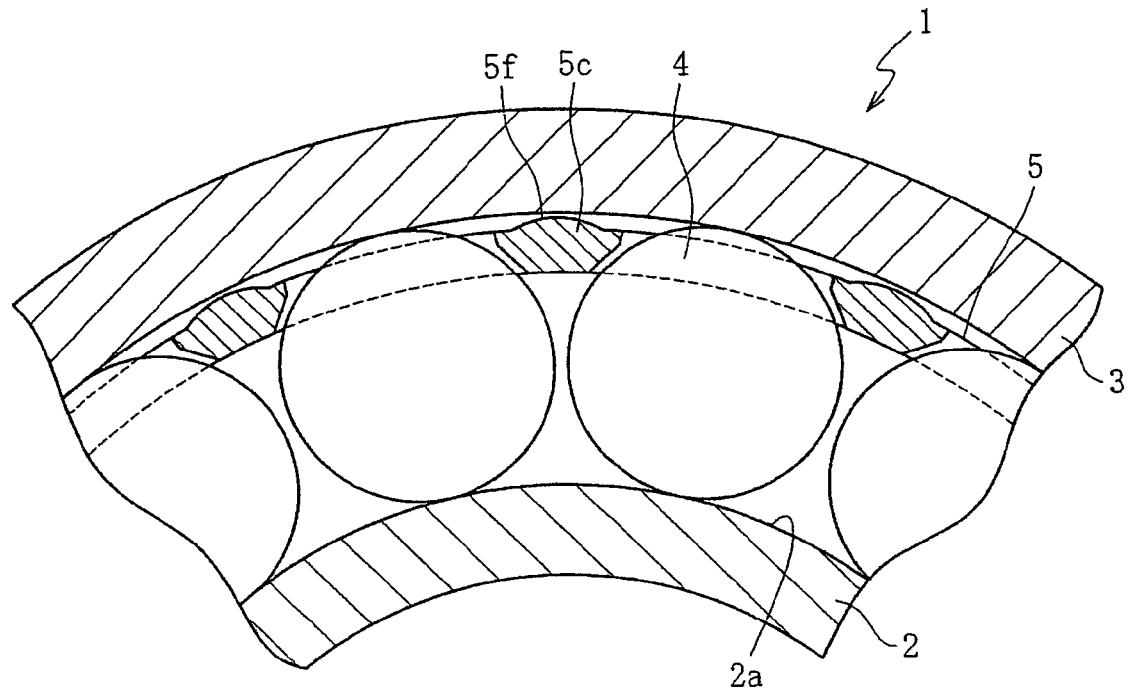
FIG. 8 is a partial sectional view of a tapered roller bearing according to a modification of the invention.
Figure 9:
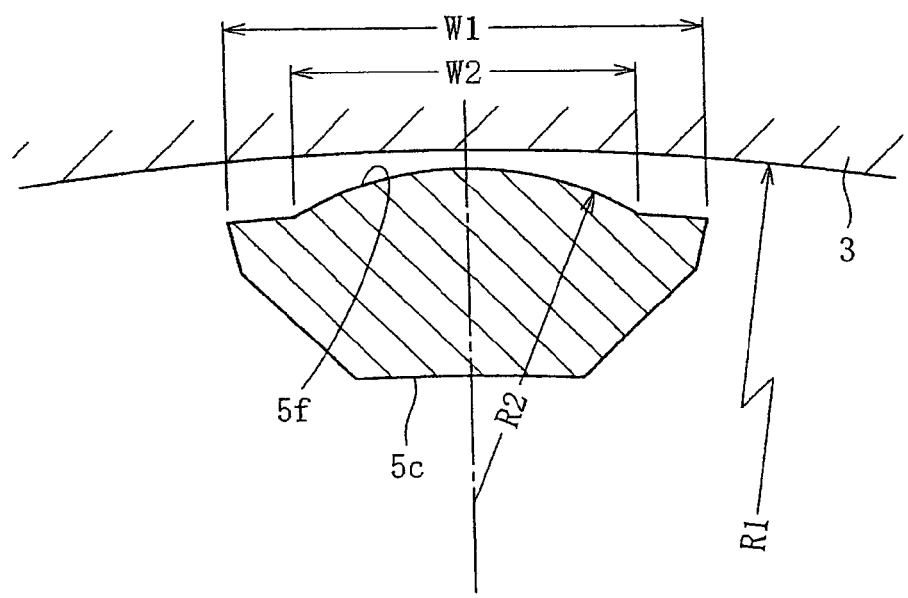
FIG. 9 is a sectional view of a bridge section of the cage shown in FIG. 8.

The tapered roller bearing 1 shown in FIGS. 8 and 9 is arranged in the manner described above, so that when the bearing 1 starts to rotate and so does the cage 5, a wedge-like oil film is formed between the outer ring raceway surface and the projecting section 5f of the cage 5. This wedge-like oil film produces a dynamic pressure substantially proportional to the rotative speed of the bearing 1. Therefore, even if the pitch circle diameter (PCD) of the cage 5 is increased beyond the conventional value so as to place the cage close to the outer ring raceway surface, the bearing 1 can be rotated without producing much wear or torque loss, so that the number of rollers can be reasonably increased.

Embodiments of the invention have been described so far, but the invention is not limited thereto and various modifications are possible. For example, while in the embodiments, such super engineering plastic as PEEK, PA, PPA, or PAI has been used as a cage material, use may be made of a material prepared by blending glass fiber or carbon fiber with such resin material or with other engineering plastic so as to increase strength as the need arises.

The tapered roller bearing 1 of this invention, besides being incorporated into the transmission of an automobile, can be used for other applications than the differential gear of an automobile and automobile gear devices.

What is claimed is:

1. A tapered roller bearing comprising:
    an inner ring,
    an outer ring,
    a plurality of tapered rollers rollably disposed between the inner and outer rings, and
    a cage for holding the tapered rollers at predetermined circumferential intervals, wherein a window angle of pockets defined in the cage and within which the tapered rollers are held ranges from 60° to 80°, and
    wherein the tapered roller bearing satisfies a relationship of (a circumferential length on a pitch circle diameter)−(roller diameter×the number of rollers)<roller diameter, and wherein the roller diameter is determined by:

(a small-end diameter of the tapered roller+a large-end diameter of the tapered roller)/2, and wherein the cage includes a pole section disposed between neighboring tapered rollers and having a projection extending from an outer surface thereof toward an inner surface of the outer ring.

2. A tapered roller bearing as set forth in claim 1, wherein the projection is convex in shape.

3. A tapered roller bearing as set forth in claim 1, wherein a cross-sectional contour of the pole section is arcuate.

4. A tapered roller bearing as set forth in claim 1, wherein a radius of curvature of the projection is less than a radius of the tapered raceway surface of the outer ring.

5. A tapered roller bearing comprising:
   an inner ring,
   an outer ring,
   a plurality of tapered rollers rollably disposed between the inner and outer rings, and
   a cage for holding the tapered rollers at predetermined circumferential intervals, wherein a window angle of pockets defined in the cage and within which the tapered rollers are held ranges from 60° to 80°,
   wherein the tapered rollers are uniformly disposed such that a distance between rollers on a pitch circle diameter is less than (roller diameter/the number of rollers), and wherein the roller diameter is determined by:

(a small-end diameter of the tapered roller+a large-end diameter of the tapered roller)/2, and wherein the cage includes a pole section disposed between neighboring tapered rollers and having a projection extending from an outer surface thereof toward an inner surface of the outer ring.

6. A tapered roller bearing as set forth in claim 1 or 5, wherein the cage is constructed of an engineering plastic selected from one of polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), ultra high molecular weight polyethylene (UHMW-PE), polysulfone (PSF), polyether sulfone (PES), polyphenylene sulfide (PPS), polyarylate (PAR), polyamideimide (PAI), polyetherimide (PEI), Polyether-Etherketone (PEEK), liquid crystal polymer (LOP), thermoplastic polyimide (TPI), polybenzimidazole (PBI), polymethyl pentene (TPX), poly 1,4-cyclohexane dimethylene terephthalate (PCT), polyamide 46 (PA46), polyamide 6T (PS6T), polyamide 9T (PA9T), polyamide 11, 12) (PA11, 12), fluororesin, and polyphthalamide (PPA).

7. A tapered roller bearing as set forth in claim 5, wherein the projection is convex in shape.

8. A tapered roller bearing as set forth in claim 5, wherein a cross-sectional contour of the pole section is arcuate.

9. A tapered roller bearing as set forth in claim 2, wherein a radius of curvature of the projection is less than a radius of the tapered raceway surface of the outer ring.

* * * * *